United States Patent
Zeng

(10) Patent No.: US 9,964,804 B2
(45) Date of Patent: May 8, 2018

(54) DISPLAY DEVICE COMPRISING A PLURALITY OF REFLECTOR UNITS LOCATED BETWEEN A QUANTUM DOT FILM AND A DISPLAY PANEL

(71) Applicant: Shenzhen China Star Optoelectronics Technology Co., Ltd., Shenzhen (CN)

(72) Inventor: Yi Zeng, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 341 days.

(21) Appl. No.: 14/908,550

(22) PCT Filed: Dec. 24, 2015

(86) PCT No.: PCT/CN2015/098646
§ 371 (c)(1),
(2) Date: Jan. 29, 2016

(87) PCT Pub. No.: WO2017/084156
PCT Pub. Date: May 26, 2017

(65) Prior Publication Data
US 2017/0261812 A1    Sep. 14, 2017

(30) Foreign Application Priority Data
Nov. 16, 2015 (CN) .......................... 2015 1 0785403

(51) Int. Cl.
*G02F 1/1335* (2006.01)
*G02F 1/1368* (2006.01)

(52) U.S. Cl.
CPC ...... *G02F 1/133605* (2013.01); *G02F 1/1368* (2013.01); *G02F 1/133512* (2013.01);
(Continued)

(58) Field of Classification Search
CPC ... G02F 1/133605; G02F 2001/133614; G02F 2202/36
See application file for complete search history.

(56) References Cited

U.S. PATENT DOCUMENTS

2007/0200492 A1* 8/2007 Cok ...................... H01L 27/322
 313/506
2011/0176328 A1* 7/2011 Anandan .............. G02B 6/0036
 362/606

(Continued)

FOREIGN PATENT DOCUMENTS

CN 102759050 A 10/2012
CN 102768433 A 11/2012

*Primary Examiner* — Paul Lee
(74) *Attorney, Agent, or Firm* — Leong C. Lei

(57) ABSTRACT

The present invention provides a display device using a quantum dot film, including a display panel, a backlight module (2) located under the display panel, a quantum dot film (3) located between the display panel and the backlight module (2), and a plurality of reflector units (41) located between the quantum dot film (3) and the display panel. The quantum dot film (3) can be excited by light emitting from the backlight module to give off excitation light. The liquid crystal panel includes therein a black matrix. The plurality of reflector units (41) is arranged to correspond to the black matrix. The display device using a quantum dot film of the present invention has a wide color gamut range and has good image quality and high quantum dot excitation rate and utilization of backlighting.

16 Claims, 4 Drawing Sheets

(52) U.S. Cl.
CPC .. *G02F 1/133514* (2013.01); *G02F 1/133528* (2013.01); *G02F 1/133606* (2013.01); *G02F 2001/133614* (2013.01); *G02F 2202/36* (2013.01)

(56) References Cited

U.S. PATENT DOCUMENTS

| | | | | |
|---|---|---|---|---|
| 2012/0274882 A1* | 11/2012 | Jung | ................ | G02F 1/133617 349/96 |
| 2012/0287381 A1* | 11/2012 | Li | ................... | G02F 1/133617 349/106 |
| 2013/0341666 A1* | 12/2013 | Yoshida | ............... | H01L 33/501 257/98 |
| 2014/0036203 A1* | 2/2014 | Guillou | ........... | G02F 1/133615 349/62 |
| 2014/0204128 A1* | 7/2014 | Jiang | ................ | G02F 1/133617 345/690 |
| 2014/0233212 A1* | 8/2014 | Park | ................. | G02F 1/133606 362/84 |

* cited by examiner

1

DISPLAY DEVICE COMPRISING A PLURALITY OF REFLECTOR UNITS LOCATED BETWEEN A QUANTUM DOT FILM AND A DISPLAY PANEL

BACKGROUND OF THE INVENTION

1. Field of the Invention

The present invention relates to the field of display technology, and in particular to a display device using a quantum dot film.

2. The Related Arts

With the continuous progress of the display technology, people are increasingly demanding higher quality of display. The color gamut that the liquid crystal television that are currently available in the market can display is in the range of 68%-72% NTSC (National Television Standards Committee), making it not possible to provide a high quality color effect.

Quantum dots (QDs) are semiconductor crystal particles having a particle size between 1-100 nm. The particle sizes of QDs are relatively small, smaller than or close to the exciton Bohr radius, and may cause the quantum confinement effect so that the continuous energy band structure of the base material may be converted into a separate energy band structure. Under the excitation of external energy, electrons may migrate and emit fluorescence.

Such a unique energy band separation structure of the QDs make the full width at half maximum thereof relatively narrow and may thus emit monochromic light having improved purity, providing a higher light emission efficiency than the conventional display devices. Also, since the energy band gaps of the QDs is greatly affected by the size thereof, it is possible to adjust the size of the QDs or use different ingredients of QDs to emit different wavelengths of light. To satisfy the needs of people for wide gamut and high color saturation, inclusion of electroluminescent QD devices in backlight modules is an effective solution for the major display manufacturers.

However, to use a QD material in backlighting, the excitation efficiency of QDs is always a practical issue of concerns. Directly using backlighting to excite QDs may readily lead to the problem of poor excitation efficiency.

SUMMARY OF THE INVENTION

An object of the present invention is to provide a display device that uses a quantum dot film so that the quantum dot film may be used to increase the gamut range of the display device and a reflector unit between the quantum dot film and a display panel may be used to increase the excitation efficiency of the quantum dots and the utilization of backlighting.

To achieve the above object, the present invention provides a display device using a quantum dot film, which comprises a display panel, a backlight module located under the display panel, a quantum dot film located between the display panel and the backlight module, and a plurality of reflector units located between the quantum dot film and the display panel;

the quantum dot film being excitable by light emitting from the backlight module to give off excitation light; the liquid crystal panel comprising therein a black matrix, the plurality of reflector units being arranged to correspond to the black matrix.

The plurality reflector units is arranged in the form of an array and collectively defines a reflective material array.

The reflector units are made of a material that comprises metals or films formed by dispersing tiny glass particles having high refractive index or micro-crystallite structure dispersed in resin.

The reflector units are arranged on the quantum dot film.

The display panel comprises a color filter substrate, a thin-film transistor (TFT) array substrate opposite to the color filter substrate, a liquid crystal layer sealed between the color filter substrate and the TFT array substrate, an upper polarizer located on one side of the color filter substrate that is distant from the TFT array substrate, and a lower polarizer located on one side of the TFT array substrate that is distant from the color filter substrate; and the black matrix is arranged on the color filter substrate or the TFT array substrate.

The reflector units are arranged on the lower polarizer.

The reflector units have surface that face the quantum dot film and are subjected to physical or chemical modification to provide a scattering effect.

The quantum dot film is formed of a paste base material and a quantum dot material dispersed in the paste base material, the backlight module emitting blue light or blue-violet light.

The quantum dot material is composed of a red quantum dot material, a green quantum dot material, and a blue quantum dot material that, when excited by light, respectively give off red, green, and blue light.

The quantum dot material is composed of a red quantum dot material and a green quantum dot material that, when excited by light, respectively give off red and green light; the backlight module emits blue light.

The present invention also provides a display device using a quantum dot film, which comprises a display panel, a backlight module located under the display panel, a quantum dot film located between the display panel and the backlight module, and a plurality of reflector units located between the quantum dot film and the display panel;

the quantum dot film being excitable by light emitting from the backlight module to give off excitation light; the liquid crystal panel comprising therein a black matrix, the plurality of reflector units being arranged to correspond to the black matrix;

wherein the plurality reflector units is arranged in the form of an array and collectively defines a reflective material array;

wherein the reflector units are made of a material that comprises metals or films formed by dispersing tiny glass particles having high refractive index or micro-crystallite structure dispersed in resin;

wherein the display panel comprises a color filter substrate, a thin-film transistor (TFT) array substrate opposite to the color filter substrate, a liquid crystal layer sealed between the color filter substrate and the TFT array substrate, an upper polarizer located on one side of the color filter substrate that is distant from the TFT array substrate, and a lower polarizer located on one side of the TFT array substrate that is distant from the color filter substrate; and the black matrix is arranged on the color filter substrate or the TFT array substrate;

wherein the quantum dot film is formed of a paste base material and a quantum dot material dispersed in the paste base material, the backlight module emitting blue light or blue-violet light.

The efficacy of the present invention is that the present invention provides a display device using a quantum dot film, which comprises a quantum dot film arranged between a display panel and a backlight module. The quantum dot film is excited by light from the backlight module to emit excitation light having a reduced full width at half maximum so as to effectively increase the gamut range of the display device and improve image quality. Further, the display device using a quantum dot film according to the present invention further comprises a reflective material array arranged to correspond to a black matrix. Compared to a conventional display device that does not have a reflective material array, the reflective material array reflects the excitation light and a fraction of backlighting not being absorbed by the quantum dot film, which would be absorbed by the black matrix, back to a light guide plate of the backlight module to be scattered back into an open aperture, wherein the fraction of the backlighting that is not absorbed by the quantum dot film would be allowed to pass through the quantum dot film again to excite the quantum dots to thereby improve the excitation efficiency of the quantum dots and the utilization of the backlighting.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
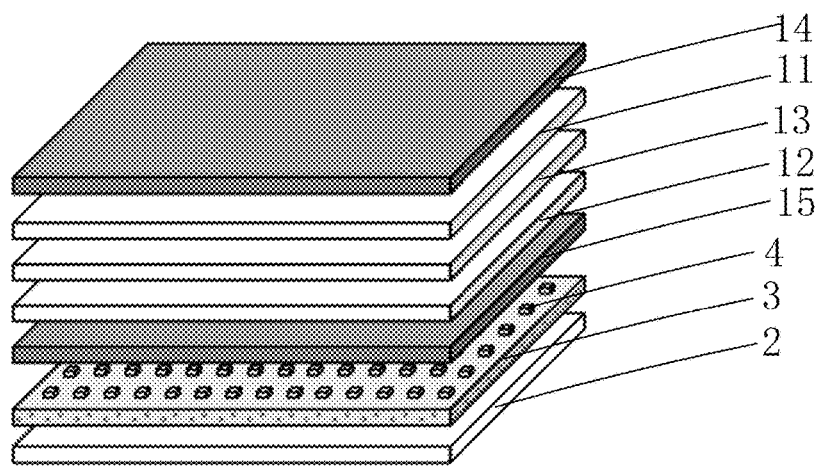
FIG. 1 is a schematic view illustrating the structure of a display device using a quantum dot film according to a first embodiment of the present invention.
Figure 4:
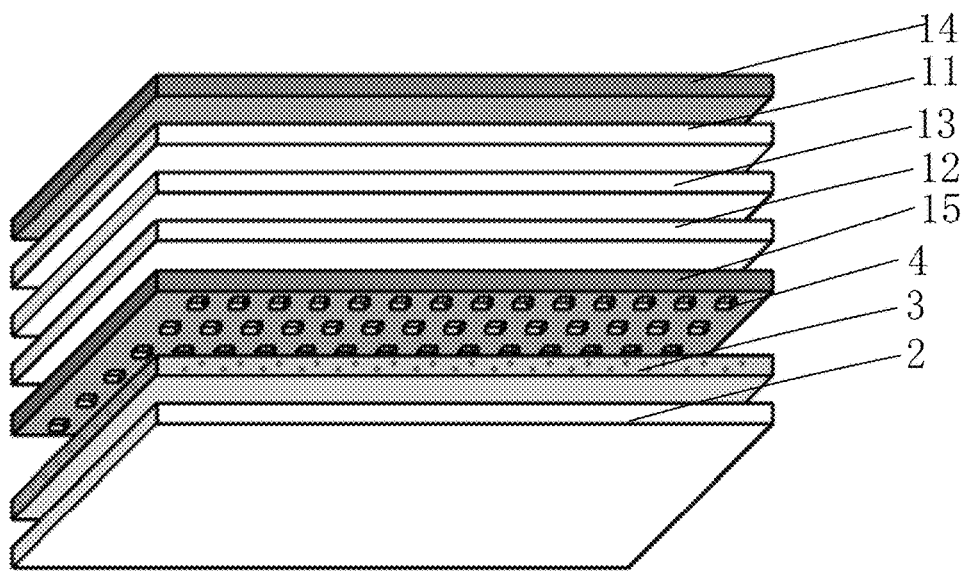
FIG. 4 is a schematic view illustrating the structure of a display device using a quantum dot film according to a second embodiment of the present invention.

Referring to FIGS. 1 and 4, the present invention provides a display device using a quantum dot film, which comprises a display panel, a backlight module 2 located under the display panel, a quantum dot film 3 located between the display panel and the backlight module 2, and a plurality of reflector units 41 located between the quantum dot film 3 and the display panel.

The quantum dot film 3 can be excited by light emitting from the backlight module 2 to give off excitation light. The liquid crystal panel comprises therein a black matrix, and the plurality of reflector units 41 is arranged to correspond to the black matrix.

Specifically, the plurality reflector units 41 is arranged in the form of an array and collectively defines a reflective material array 4.

Specifically, the display panel comprises a color filter substrate 11, a thin-film transistor (TFT) array substrate 12 opposite to the color filter substrate 11, a liquid crystal layer 13 sealed between the color filter substrate 11 and the TFT array substrate 12, an upper polarizer 14 located on one side of the color filter substrate 11 that is distant from the TFT array substrate 12, and a lower polarizer 15 located on one side of the TFT array substrate 12 that is distant from the color filter substrate 11. The black matrix is arranged on the color filter substrate 11 or the TFT array substrate 12.

Figure 3:
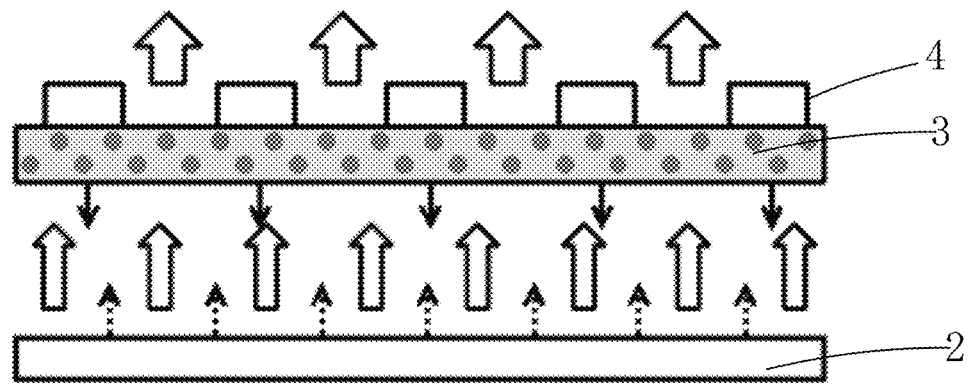
FIG. 3 is a schematic view illustrating light paths of the display device using a quantum dot according to the first embodiment of the present invention.
Figure 5:
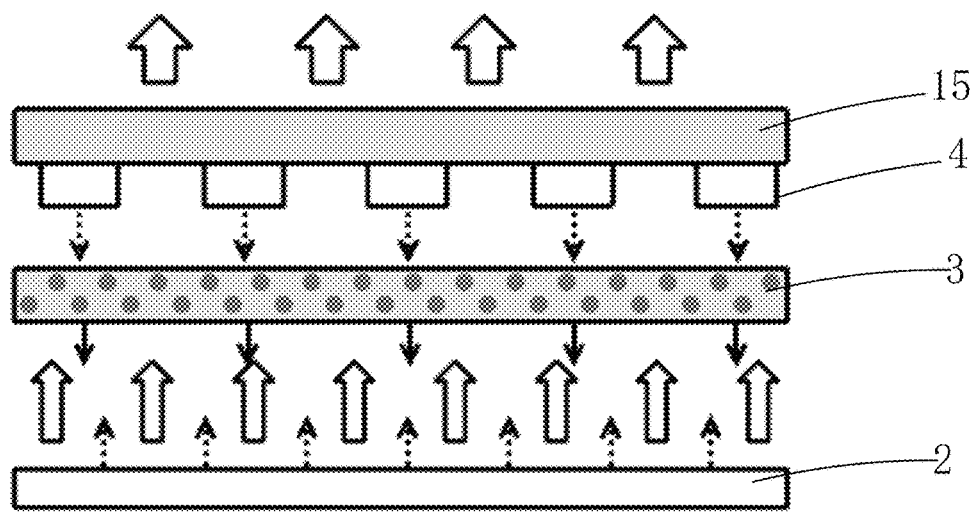
FIG. 5 is a schematic view illustrating light paths of the display device using a quantum dot according to the second embodiment of the present invention.
Figure 7:
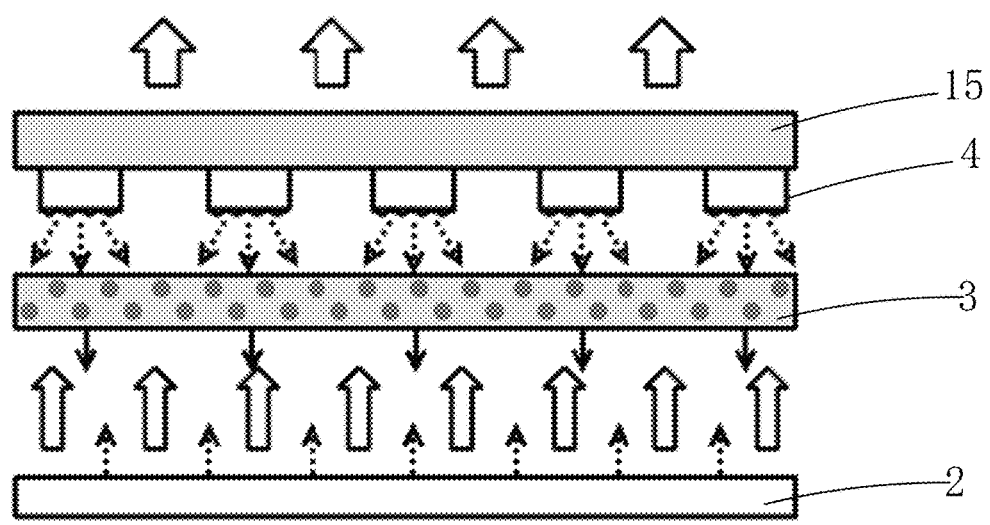
FIG. 7 is a schematic view illustrating light paths of the display device using a quantum dot according to the third embodiment of the present invention.

Specifically, as shown in FIGS. 3, 5, and 7, light emits from the backlight module and passes through the quantum dot film 3 to excite and generate excitation light having a narrower full width at half maximum so as to increase the gamut range of the display device and improve image quality. Further, light that passes through the quantum dot film 3 includes the excitation light and a fraction of backlighting that is not absorbed by the quantum dot film 3. In case there is no reflective material array, a percentage of the excitation light and the backlighting that is not absorbed by the quantum dot film 3 would be absorbed by the black matrix (BM) of the display panel; however, the display device using a quantum dot film according to the present invention comprises a reflective material array 4, and the reflective material array 4 reflects the excitation light and the fraction of backlighting not absorbed by the quantum dot film, which would be absorbed by the black matrix, back to a light guide plate of the backlight module to be scattered back into an open aperture, wherein the fraction of the backlighting that is not absorbed by the quantum dot film would be allowed to pass through the quantum dot film 3 again to excite the quantum dots to thereby improve the excitation efficiency of the quantum dots and the utilization of the backlighting.

Specifically, the reflector units 41 are made of a material that comprises metals or films formed by dispersing tiny glass particles having high refractive index or micro-crystallite structure dispersed in resin.

Specifically, the quantum dot film 3 is formed of a paste base material and a quantum dot material dispersed in the paste base material. The backlight module gives off blue light or blue-violet light.

When the quantum dot material is composed of a red quantum dot material, a green quantum dot material, and a blue quantum dot material that, when excited by light, respectively give off red, green, and blue light, the backlight module may emit blue light or blue-violet light.

When the quantum dot material is composed of a red quantum dot material and a green quantum dot material that, when excited by light, respectively give off red and green light, the backlight module may emit blue light and under this condition, the excitation light emitting from the quantum dot film 3 and the blue light emitting from the backlight module can be mixed together to form white light.

Specifically, the quantum dot material can be a binary semiconductor material selected from a group including ZnS, ZnSe, ZnTe, CdS, CdSe, CdTe, MnSe, HgS, HgSe, HgTe, AlN, AlP, AlAs, AlSb, GaN, GaP, GaAs, GaSb, GaSe, InN, InP, InAs, InSb, TIN, TIP, TIAs, TISb, PbS, PbSe and PbTe; or a ternary or higher semiconductor material selected from a group including $CdxZn1-xSe$, $CdxZn1-xS$, $CuInS2$, $CuInSe2$, $AgInS2$, $AgInSe2$, $InxGa1-xP$, and $CdxZn1-xSySe1-y$; or a doped semiconductor material selected from a group including MnSe:Cu, MnSe:Mn, CdS:Cu, CdS:Mn, In2S3:Cu, ZnO:Cu, and ZnO:Mn.

Specifically, the reflective material array 4 can be arranged above the quantum dot film 3, or can alternatively be arranged under the lower polarizer 15. It is noted here that both the quantum dot film 3 and the reflective material array 4 must be arranged under the lower polarizer 14 because the excitation light that is emitted by the backlighting exciting the quantum dot film 3 is transmitted in a random direction and excitation of the quantum dot film is conducted between the upper and lower polarizers, then there is no way to ensure a desired polarization state of light and may cause light leakage.

Figure 2:
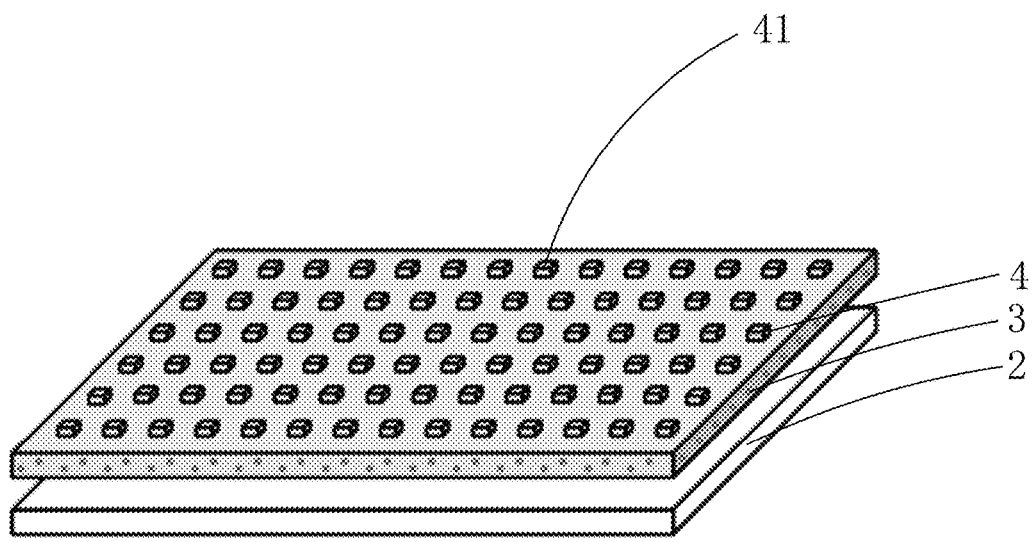
FIG. 2 is a schematic view illustrating a backlight module, a quantum dot film, and a reflective material array of the display device using a quantum dot film according to the first embodiment of the present invention.

Referring to FIG. 1, a schematic view is given to illustrate the structure of a display device using a quantum dot film according to a first embodiment of the present invention. In the instant embodiment, as shown in FIG. 2, the reflective material array 4 is arranged on the quantum dot film 3.

Specifically, as shown in FIG. 3, light emits from the backlight module 2 and passes through the quantum dot film 3 to excite and generate excitation light having a narrower full width at half maximum. The light that transmits through the quantum dot film 3 includes excitation light and a fraction of the backlighting that is not absorbed by the quantum dot film 3. The reflective material array 4 is arranged on the quantum dot film 3 to correspond to the black matrix. The reflective material array 4 reflects the excitation light and the fraction of backlighting not absorbed by the quantum dot film, which would be absorbed by the black matrix, back to the backlight module to be re-scattered back into the open aperture, wherein the fraction of the backlighting that is not absorbed by the quantum dot film would be allowed to pass through the quantum dot film 3 again to excite the quantum dots to thereby improve the excitation efficiency of the quantum dots and the utilization of the backlighting.

Referring to FIG. 4, a schematic view is given to illustrate the structure of a display device using a quantum dot film according to a second embodiment of the present invention. Compared to the first embodiment, the instant embodiment makes the reflective material array 4 arranged on the lower polarizer 15.

Specifically, as shown in FIG. 5, in the instant embodiment, the reflective material array 4 are arranged on the lower polarizer 15 to similarly achieve he purposes of increasing the excitation efficiency of quantum dots and utilization of backlighting.

Figure 6:
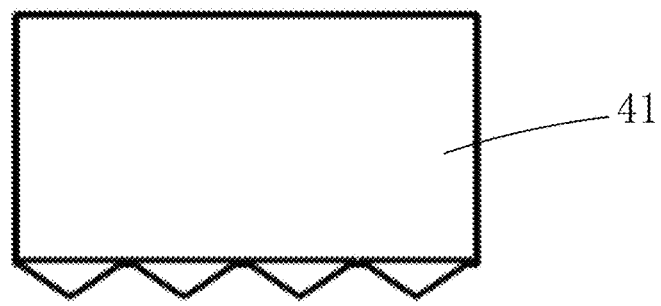
FIG. 6 is a schematic view illustrating a reflector unit of a display device using a quantum film according to a third embodiment of the present invention.

As shown in FIGS. 6-7, a display device using a quantum dot film according to the a third embodiment of the present invention, when compared to the second embodiment, makes surfaces of the reflector units 41 of the reflective material array 4 that face the quantum dot film 3 subjected to physical or chemical modification to provide a scattering effect so as to further improve homogeneity of reflection light.

In summary, the present invention provides a display device using a quantum dot film, which comprises a quantum dot film arranged between a display panel and a backlight module. The quantum dot film is excited by light from the backlight module to emit excitation light having a reduced full width at half maximum so as to effectively increase the gamut range of the display device and improve image quality. Further, the display device using a quantum dot film according to the present invention further comprises a reflective material array arranged to correspond to a black matrix. Compared to a conventional display device that does not have a reflective material array, the reflective material array reflects the excitation light and a fraction of backlighting not being absorbed by the quantum dot film, which would be absorbed by the black matrix, back to a light guide plate of the backlight module to be scattered back into an open aperture, wherein the fraction of the backlighting that is not absorbed by the quantum dot film would be allowed to pass through the quantum dot film again to excite the quantum dots to thereby improve the excitation efficiency of the quantum dots and the utilization of the backlighting.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A display device using a quantum dot film, comprising a display panel, a backlight module located under the display panel, a quantum dot film located between the display panel and the backlight module, and a plurality of reflector units located between the quantum dot film and the display panel;
   the quantum dot film being excitable by light emitting from the backlight module to give off excitation light; the liquid crystal panel comprising therein a black matrix, the plurality of reflector units being arranged to correspond to the black matrix.

2. The display device using a quantum dot as claimed in claim 1, wherein the plurality reflector units is arranged in the form of an array and collectively defines a reflective material array.

3. The display device using a quantum dot as claimed in claim 2, wherein the reflector units are made of a material that comprises metals or films formed by dispersing tiny glass particles having high refractive index or micro-crystallite structure dispersed in resin.

4. The display device using a quantum dot as claimed in claim 1, wherein the reflector units are arranged on the quantum dot film.

5. The display device using a quantum dot as claimed in claim 1, wherein the display panel comprises a color filter substrate, a thin-film transistor (TFT) array substrate opposite to the color filter substrate, a liquid crystal layer sealed between the color filter substrate and the TFT array substrate, an upper polarizer located on one side of the color filter substrate that is distant from the TFT array substrate, and a lower polarizer located on one side of the TFT array substrate that is distant from the color filter substrate; and
   the black matrix is arranged on the color filter substrate or the TFT array substrate.

6. The display device using a quantum dot film as claimed in claim 5, wherein the reflector units are arranged on the lower polarizer.

7. The display device using a quantum dot as claimed in claim 6, wherein the reflector units have surface that face the quantum dot film and are subjected to physical or chemical modification to provide a scattering effect.

8. The display device using a quantum dot as claimed in claim 1, wherein the quantum dot film is formed of a paste base material and a quantum dot material dispersed in the paste base material, the backlight module emitting blue light or blue-violet light.

9. The display device using a quantum dot as claimed in claim 6, wherein the quantum dot material is composed of a red quantum dot material, a green quantum dot material, and a blue quantum dot material that, when excited by light, respectively give off red, green, and blue light.

10. The display device using a quantum dot as claimed in claim 6, wherein the quantum dot material is composed of a red quantum dot material and a green quantum dot material that, when excited by light, respectively give off red and green light; the backlight module emits blue light.

11. A display device using a quantum dot film, comprising a display panel, a backlight module located under the display panel, a quantum dot film located between the display panel and the backlight module, and a plurality of reflector units located between the quantum dot film and the display panel;
the quantum dot film being excitable by light emitting from the backlight module to give off excitation light; the liquid crystal panel comprising therein a black matrix, the plurality of reflector units being arranged to correspond to the black matrix;
wherein the plurality reflector units is arranged in the form of an array and collectively defines a reflective material array;
wherein the reflector units are made of a material that comprises metals or films formed by dispersing tiny glass particles having high refractive index or microcrystallite structure dispersed in resin;
wherein the display panel comprises a color filter substrate, a thin-film transistor (TFT) array substrate opposite to the color filter substrate, a liquid crystal layer sealed between the color filter substrate and the TFT array substrate, an upper polarizer located on one side of the color filter substrate that is distant from the TFT array substrate, and a lower polarizer located on one side of the TFT array substrate that is distant from the color filter substrate; and
the black matrix is arranged on the color filter substrate or the TFT array substrate;
wherein the quantum dot film is formed of a paste base material and a quantum dot material dispersed in the paste base material, the backlight module emitting blue light or blue-violet light.

12. The display device using a quantum dot as claimed in claim 11, wherein the reflector units are arranged on the quantum dot film.

13. The display device using a quantum dot film as claimed in claim 11, wherein the reflector units are arranged on the lower polarizer.

14. The display device using a quantum dot as claimed in claim 13, wherein the reflector units have surface that face the quantum dot film and are subjected to physical or chemical modification to provide a scattering effect.

15. The display device using a quantum dot as claimed in claim 13, wherein the quantum dot material is composed of a red quantum dot material, a green quantum dot material, and a blue quantum dot material that, when excited by light, respectively give off red, green, and blue light.

16. The display device using a quantum dot as claimed in claim 13, wherein the quantum dot material is composed of a red quantum dot material and a green quantum dot material that, when excited by light, respectively give off red and green light; the backlight module emits blue light.

* * * * *